July 14, 1964  J. K. BARROW, JR  3,140,920
APPARATUS FOR CONTINUOUSLY PRODUCING A FERTILIZER MIXTURE
Filed March 14, 1961  2 Sheets-Sheet 1
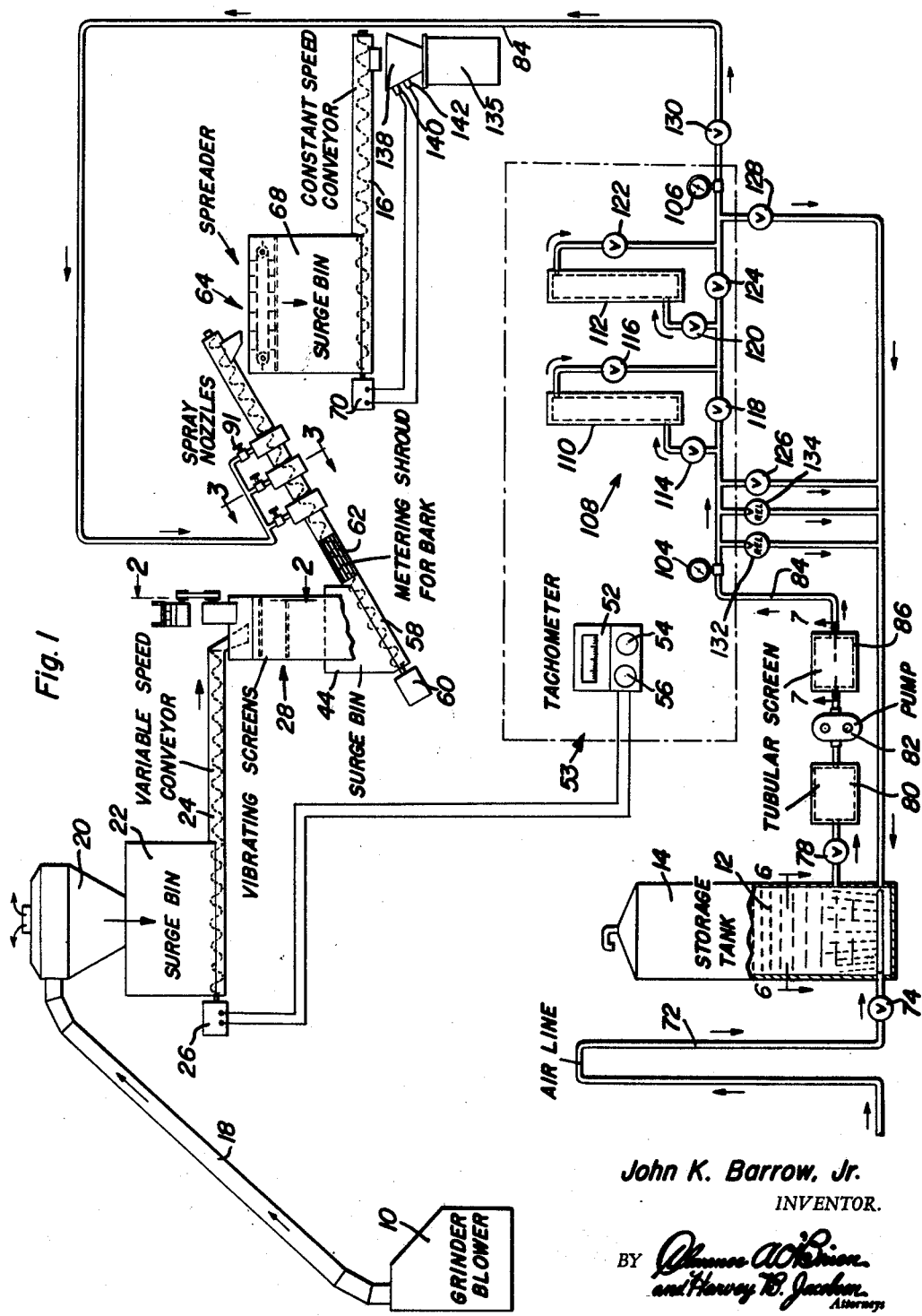
John K. Barrow, Jr.
INVENTOR.

July 14, 1964  J. K. BARROW, JR  3,140,920
APPARATUS FOR CONTINUOUSLY PRODUCING A FERTILIZER MIXTURE
Filed March 14, 1961  2 Sheets-Sheet 2
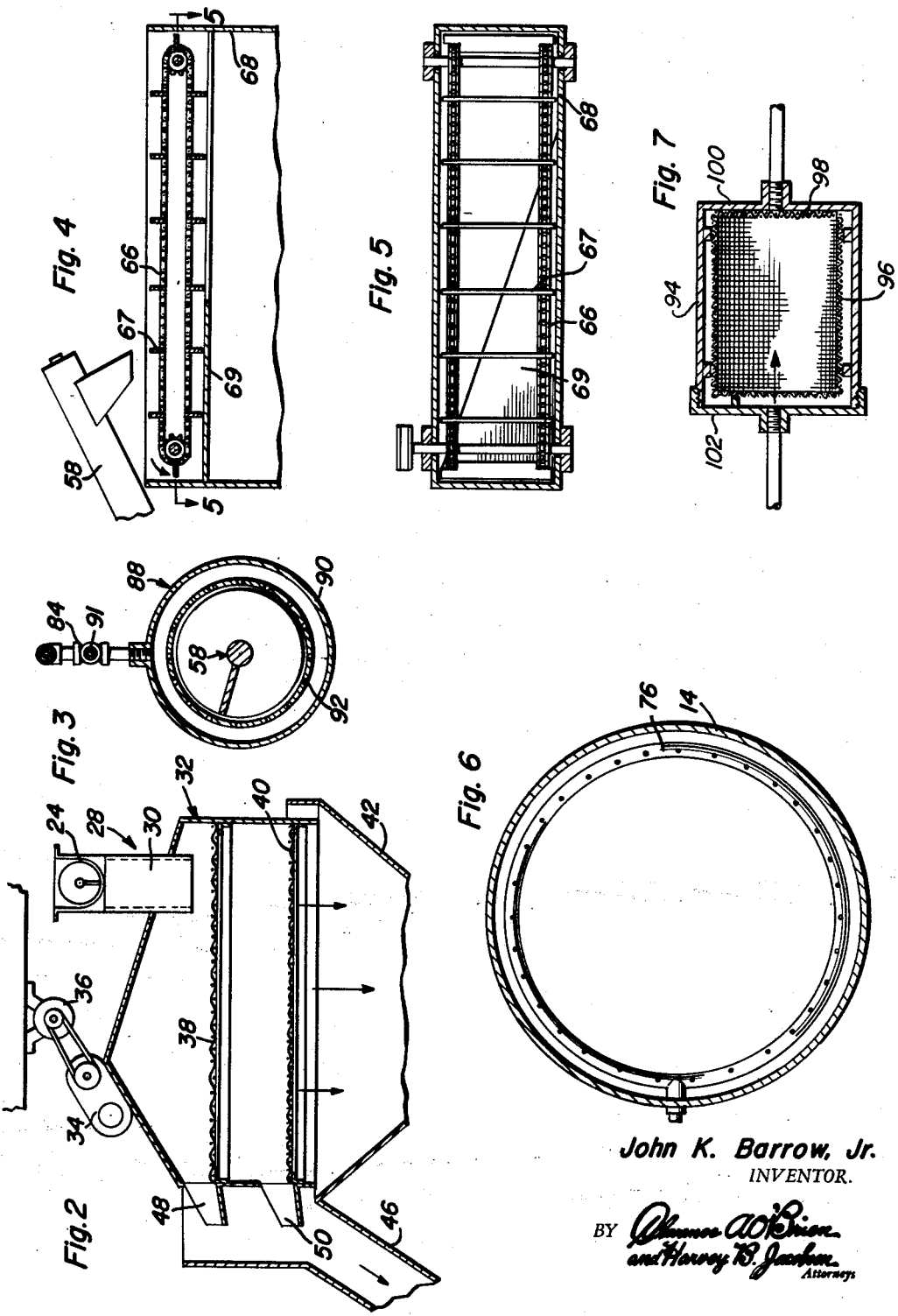
John K. Barrow, Jr.
INVENTOR.

United States Patent Office 3,140,920
Patented July 14, 1964

3,140,920
**APPARATUS FOR CONTINUOUSLY PRODUCING
A FERTILIZER MIXTURE**
John K. Barrow, Jr., 808 South St., Ahoskie, N.C.
Filed Mar. 14, 1961, Ser. No. 95,575
6 Claims. (Cl. 23—259.1)

This invention relates to a process and apparatus for treating a solid nutrient carrier with plant nutrients and in particular relates to a continuous process for mixing predetermined proportions of prepared tree bark with a liquid that may contain plant food.

The preparation and treatment of natural solid organic plant material such as tree bark with liquid plant nutrient has been heretofore accomplished by a "batch" process in which the ingredients of the mixture come to rest for measuring and mixing purposes. This type of mixing process has logically been adopted because of the non-uniform fluent property of the tree bark which would therefore seriously impair the maintenance of a uniform and constant proportions of ingredients in the final product if mixed by a continuous process necessarily involving a flow of tree bark. The process of the present invention nevertheless is a continuous process in which the ingredients are measured and mixed while they are in motion. As a result thereof, the process may be accomplished in a more rapid manner and economical manner characteristic of a continuous process without sacrifice of the accuracy in the proportions of the ingredients constantly maintained in a reliable manner. Also, the process may be performed under the control of a single operator. It is therefore a primary object of this invention to provide a continuous process for preparing tree bark or the like and mixing it in predetermined constant proportions with liquid for mixing of plant nutrient with the tree bark carrier in a more rapid and accurately reliable manner than was heretofore thought possible.

Another object of this invention is to provide a novel process and apparatus for preparing and treating tree bark or the like with a nutrient in a continuous manner and under the control of a single operator with the process continuing for an indefinite period of time.

A further object of this invention is to provide a process and apparatus for continuously preparing and treating tree bark with a liquid nutrient, the process being under the control of a single operator and capable of being regulated in accordance with the supply of tree bark and liquid nutrient and the demands on the output of the process.

The process of the present invention therefore, involves the reduction of a solid plant material such as tree bark to particle size by grinding of the tree bark in order to render it fluent and conveyance thereof by a blower into a collector from which the ground up tree bark is drawn in a continuous manner. The ground up tree bark is initially conveyed by a variable speed conveyor to a vibrating screen mechanism. Inasmuch as the grinding process is unable to reduce the tree bark to any substantially uniform particle size, a vibrating screen mechanism is arranged to pass through particles of the ground up tree bark that are within a predetermined size range desired. The accepted particles of tree bark discharged through the vibrating screen mechanism is arranged to be visible to the operator at the control panel so that it may be monitored in order to regulate the speed of the variable conveyor and provide a continuous outlet flow of screened tree bark from the vibrating screen assembly. This is necessary in order to maintain the process continuously operative. The screened tree bark is then fed into a constant speed conveyor. Disposed in the constant speed conveyor is a metering shroud whereby the screened tree bark may pass therethrough and then be conveyed by the constant speed conveyor at a constant volumetric flow rate. Liquid is then introduced into the screened and metered tree bark within the constant speed conveyor by means of spray nozzles. Finally, the prepared and treated tree bark is discharged from the constant speed conveyor onto a spreader mechanism whereby the product is evenly spread or distributed along a length of a surge bin. The evenly deposited mixture of treated tree bark may then be available for intermittent delivery to a bagging machine by a constant speed conveyor which may be automatically operative by intermittent operation to fill a small surge bin of the bagging machine with predetermined quantities of the tree bark mixture. It will also be appreciated, that the supply of liquid to the spray nozzles must be regulated in order to obtain the constant predetermined proportions of the bark, moisture and nutrient ingredients. Accordingly, a pump mechanism is operatively connected between a liquid fertilizer storage tank and the spray nozzle. Flow meters and pressure gauges are accordingly interconnected between the pump and the spray nozzles in order to enable the operator to detect any variation in the pressure and flow rate of the liquid nutrient which requires corrective control of valve mechanisms in order to maintain the proper pressure and flow rate of the liquid fertilizer. The flow detecting and valve control mechanism are accordingly located on a control panel from which the variable speed drive for the variable conveyor is located so that a single operator may exercise control over the entire system.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic illustration of the apparatus of the present invention constituting the system of the present invention.

FIGURE 2 is a partial sectional view of a portion of the apparatus taken through a plane indicated by section line 2—2 in FIGURE 1.

FIGURE 3 is a partial sectional view taken through a plane indicated by section line 3—3 in FIGURE 1.

FIGURE 4 is a partial sectional view of the spreader mechanism.

FIGURE 5 is a sectional view taken through a plane indicated by section line 5—5 in FIGURE 4.

FIGURE 6 is a sectional view taken through a plane indicated by section line 6—6 in FIGURE 1.

FIGURE 7 is a sectional view taken through a plane indicated by section line 7—7 in FIGURE 1.

Referring now to the drawings in detail, the system of the present invention is illustrated in FIGURE 1. The process involved in this system is operative to prepare the solid, organic tree bark carrier for mixing in predetermined proportions with a liquid fertilizer or plant food which may consist of a preblend of liquid containing plant food including for example such elements as nitrogens, phosphoric acid, potash, etc. The tree bark is removed from logs by a mechanical debarker and is rendered fluent by being ground up by a hammer mill type grinder. The grinder produces a large percentage of ground bark particles within the desired range of sizes for the purposes of the product being produced by the process of the present invention. Referring therefore to FIGURE 1, it will be observed that the grinder and blower mechanism generally referred to by reference numeral 10 is the starting point of the process of the present invention. The desired liquid fertilizer referred to by reference numeral 12 is stored within a storage tank 14 from which it is drawn for mixing with the tree bark. The tree bark and the liquid fertilizer proceed respectively from the mechanism 10 and the storage tank 14 through the process apparatus with the product being delivered to bagging machines by the constant speed delivery conveyor generally referred to by reference numeral 16. As long as the grinder blower mechanism 10 is supplied with tree bark and the storage tank 14 supplied with liquid fertilizer, a continuously operating process will supply the variable demands of the bagging machine connected to the delivery conveyor 16.

The ground tree bark is blown by an exhaust fan (not shown) located within the mechanism 10 through a conduit 18 as indicated by the arrows in FIGURE 1 into a cyclonal type metal collector 20. The ground bark conveying air is exhausted through the top of the collector while the ground-up tree bark drops from the collector into a surge bin 22.

From the surge bin 22, the ground tree bark is carried by a variable speed screw conveyor 24 which is driven by a variable speed motor 26. The variable speed conveyor 24 carries the ground up tree bark into a visible flow vibrating screen mechanism generally referred to by reference numeral 28. Referring now to FIGURE 2 in particular, it will be observed that the conveyor 24 includes a terminal portion 30 through which the ground up tree bark is delivered to a vibrating screen assembly generally referred to by reference numeral 32. The screen assembly is accordingly vibrated by means of a vibrating mechanism 34 drivingly connected to a motor 36. Disposed within the screen assembly 32 is an upper screen 38 and a lower screen 40. The upper screen 38 is of a larger mesh which is effective in response to vibrations thereof to screen out stringy cambium particles or strips which are objectionable material. The lower screen which is of a smaller mesh, controls the size of the accepted material which is discharged therethrough into a delivery chute 42 which deposits the tree bark particles within the desired predetermined range of sizes into a surge bin 44 the top of which is arranged at a low level enabling the operator to look into the bin so as to observe the amount of ground bark available. The flow of material into the surge bin 44 will therefore be visible to the operator who may accordingly control the speed of the variable speed motor 26 for maintaining the flow out of the vibrating screen mechanism 28 at an approximately constant rate so as to maintain the process operative for indefinite periods of time. The waste material is conducted to a waste conveyor by means of the waste chute 46 as seen in FIGURE 2 which is supplied with waste material from outlet spouts 48 and 50 mounted on the vibrating screen assembly 32 adjacent to ends of the screens 38 and 40 respectively. The oversized and and undesirable tree bark particles rejected by the vibrating screen may accordingly be removed from the process. The ground bark particles of the desired size and quality capable of being conditioned for substantially uniform flow will be delivered to the surge bin 44. In order to control the quantity of desirable screened tree bark delivered to the surge bin 44, the variable speed motor 26 is operatively connected to a remote control mechanism 52 including a speed indicating mechanism and a pair of control buttons 54 and 56 by means of which the operator may increase or decrease the speed of the motor 26. The control mechanism 52 is accordingly mounted on a control panel 53 located so that flow through the vibrating screen mechanism 28 may be observed by the operator so that he may appropriately control the speed of the motor 26. It will be appreciated, however, that alternatively automatic control mechanism may be utilized for varying the speed of the drive motor 26 in response to variations in the flow from the vibrating screen mechanism 28. It will be appreciated that a variation in the supply of tree bark will be necessary inasmuch as no load of tree bark will have a uniform proportion of the desirable particle sizes.

The surge bin 44 also, must at all times contain a sufficient quantity of screened tree bark to keep the constant speed conveyor mechanism 58 full of bark for delivering a constant volume thereof. The constant speed conveyor mechanism 58 is accordingly driven by a constant speed motor 60 with the lower end portion thereof being connected to and in communication with the interior of the surge bin 44. The screened tree bark will accordingly be conveyed upwardly through the constant speed conveyor mechanism 58. In order to condition the selected tree bark particles for uniform flow, a metering mechanism 62 is disposed within the conveyor mechanism 58 through which the tree bark passes so that the screened tree bark will continue therefrom through the conveyor mechanism 58 at a constant volumetric rate of speed. After passing through the metering mechanism 62, within the constant speed conveyor 58, the ground, screened and metered bark is then sprayed with a liquid plant food mixture. The tree bark so treated with the liquid plant food is then discharged from the upper end of the conveyor mechanism 58 onto a spreader mechanism generally referred to by reference numeral 64.

Referring therefore to FIGURE 4 in particular, it will be observed that the spreader mechanism may include a constantly moving apertured endless chain conveyor 66 having slats 67 connected thereto. A triangular plate 69 over which the slats 67 move provides a progressively enlarged opening in a direction away from the outlet of the conveyor mechanism 58 to deposit the ground, screen, metered and treated bark into the surge bin 68. The bark is thereby distributed evenly into a surge bin 68 with respect to particle size providing a uniform mixture of bark particle sizes within the entire surge bin. Heretofore, the deposit from the conveyor caused undesirable local accumulations of different particle sizes within the delivery surge bin.

The ground, screened, metered and treated bark remains in the surge bin 68 until it is called for by the bagging machine. The delivery conveyor 16 is accordingly operated at a constant speed by means of motor 70 but its operation is intermittently controlled in accordance with the demands of the bagging machine. For example, the bagging machine 135 may be of the type which includes a small surge bin 138 which is supplied by a delivery conveyor 16 and which small surge bin includes levelling eyes 140 and 142 which automatically discontinue operation of the delivery conveyor 16 when a predetermined quantity of prepared and treated tree bark is delivered thereto in order to maintain the bagging machine continuously operative.

The preblended plant food liquid mixture is received within the storage tank 14. In order to prevent the heavy ingredients of the liquid mixture from settling and separating, the liquid is maintained in a state of agitation by being mixed with compressed air. Accordingly, an air compressor (not shown) may be connected to the bottom of the storage tank 14 by a conduit 72. The conduit 72 makes a U-turn above the top of the storage tank in order to prevent the liquid from feeding back into the compressed air reservoir or air compressor. A cut-off valve 74 is therefore also provided and may be operated to intermittently subject the liquid to the agitating action of the compressed air. Referring therefore to FIGURE 6 in particular, it will be observed that the compressed air is admitted to the tank 14 by a ring member 76 which is perforated on the inside and disposed near the bottom of the liquid tank. The compressed air released through the holes in the perforated circular ring pipe 76 causes agitation of the liquid and maintains it in a mixed condition over the entire tank.

The liquid 12 is drawn from the storage tank through a valve 78 and a tubular screen mechanism 80 connected to the inlet end of a constant displacement gear pump 82. The discharge of the pump mechanism 82 is connected to a supply conduit 84 also through a second tubular screen mechanism 86 identical to that of the screen mechanism 80. The screen mechanism 80 and 86 are operative to filter out foreign matter from the liquid that may cause injury to the pump and also remove small particles of foreign matter which may cause malfunctioning of the flow detecting mechanism disposed in the connecting conduit 84 which is connected to a spray nozzle mechanism generally referred to by reference numeral 88.

Referring therefore to FIGURE 3 in particular, it will be observed that the spray nozzle mechanism 88 includes a series of annular enclosed members 90 to which the conduit 84 is connected through respective cut-off valves 91. The pressure in the system is thereby controlled by selective opening and closing of a suitable number of these cut-off valves. The manifold members 90 are disposed about the casing of the conveyor mechanism 58 at a portion through which the tree bark passes after being screened and metered. The perforations 92 are accordingly provided within the casing of the conveyor mechanism 58 and within the manifold members 90 so that the liquid plant food is sprayed uniformly over the entire cross-section of the prepared and treated tree bark passing therethrough.

Referring now to FIGURE 7, it will be observed that the tubular screen mechanisms 80 and 86 includes a cylindrical member 94 which is hydraulically connected to the outlet of the supply tank or pump mechanism for the passage of the liquid therethrough. Supported within the cylindrical member 94 is a cylindrical screen 96 with the axial end 98 on the downstream side of the liquid flow being secured to the outlet end wall 100 of the cylindrical member 94. The cylindrical screen member 96 is on the other hand spaced from the other walls of the tubular member 94. Liquid may accordingly pass through the screen member 96 for filtering purposes. A removable end cap member 102 is accordingly connected to the other axial end of the cylindrical member 94 for the purpose of disassembling and cleaning the screening mechanisms 80 and 86.

A pair of liquid pressure gauges 104 and 106 are disposed in the conduit 84 in spaced relation to each other and form part of a flow detecting assembly generally referred to by reference numeral 108. The gauges 104 and 106 accordingly indicate the change in pressure of the liquid passing through the flow detecting assembly 108. The assembly 108 also includes a pair of spaced liquid flow meters 110 and 112 of any suitable type which may be arranged in series so that when their readings are not identical, malfunctioning of the system due to improper liquid flow may be detected and corrected. Valve mechanism 114 and 116 are connected on the inlet and outlet sides respectively of the flow meter 110 and are open while the by-pass valve mechanism 118 is closed in order to direct liquid flow through the meter 110. Similarly, inlet valve 120 and outlet valve 122 are provided in connection with the flow meter 112 as well as by-pass valve 124 so that the liquid flow may be directed in series through both flow meters 110 and 112. It will therefore be appreciated, that the flow meters 110 and 112 may alternatively be connected into the process or disconnected therefrom by opening by-pass valve 118 and 124 and closing the valves 114, 116, 120 and 112, so that the flow meters may then be repaired or cleaned while the process continues.

In order to control the flow to the spray nozzle mechanism 88, flow control valve 126 is disposed before the flow meters for the purpose of controlling the flow rate of the liquid. Also, provided is a cut-off valve 130 which may be operated to disconnect the liquid from the system when desired. A return valve 128 is provided and opened when the spray mechanism is disconnected from the liquid source by cut-off valve 130, so the liquid may continue to circulate permitting the system to remain in stand-by operation.

Return relief valves 132 and 134 are provided to prevent excessive pressure in the system due to malfunction of the apparatus.

From the foregoing description, operation and utility of the process and the apparatus of the present invention will be apparent. It will therefore be appreciated that a single operator may control the process in order to maintain it continuously operative despite variations in the demands of the bagging machine to which the process system is connected and more reliably supply a constant proportion of ingredients and moisture for the product mixture despite the non-uniformity in flow and particle size of the raw supply of ground-up tree bark.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for continuously producing a fertilizing mixture, comprising means for collecting and storing a ground up untreated solid plant nutrient carrier of non-uniform particle size, visible flow screening means operatively connected to the collecting means for discharging particles of the carrier within a predetermined size range, variable conveyor means operatively interconnecting the collecting means to the screening means and selectively operative to maintain a constant supply of discharged screened carrier particles from the screening means, constant conveyor means operatively connected to the screening means for conveying screened carrier particles at a constant rate of movement, metering means disposed in the constant conveyor means through which the screen carrier particles are conditioned for subsequent movement at a constant volumetric flow rate, and spray means operatively connected to the constant conveyor means for treating the screened and metered carrier particles with liquid and control means operatively connected to the variable conveyor means and spray means to respectively maintain a supply of screened carrier particles and maintain a constant proportion of liquid to nutrient carrier.

2. The combination of claim 1 wherein said screening means includes a screening assembly comprising an upper screen onto which the ground-up carrier is delivered by the variable conveyor means, and a lower screen of smaller mesh through which the carrier particles are discharged, transparent delivery means for receiving the screened carrier particles for supplying the constant conveyor means, waste conveyor means operatively connected to the delivery means for receiving rejected carrier matter from the upper and lower screens and vibrating means operatively connected to the screening assembly.

3. The combination of claim 2, including liquid nutrient supply means operatively connected to the spray means and control means, comprising, liquid nutrient storage means, means operatively connected to the storage means for maintaining the liquid in a state of agitation, pump means operatively connected to the storage means, conduit means operatively connecting the spray means to the pump means, and meter means operatively connected to the conduit means for detecting variations in pressure and flow rate of the liquid nutrient.

4. The combination of claim 3, wherein said control means comprises, variable drive means operatively connected to the variable conveyor means, a remote control mechanism operatively connected to the drive means for variation thereof in accordance with flow through the screening means, and valve means operatively connnected to the liquid supply means for regulating the flow of liquid nutrient.

5. The combination of claim 1, including liquid nutrient supply means operatively connected to the spray means and control means, comprising, liquid nutrient storage means, means operatively connected to the storage means for maintaining the liquid in a state of agitation, pump means operatively connected to the storage means, conduit means operatively connecting the spray means, to the pump means, and meter means operatively connected to the conduit means for detecting variations in pressure and flow rate of the liquid nutrient.

6. The combination of claim 1, wherein said control means comprises, variable drive means operatively connected to the variable conveyor means, a remote control mechanism operatively connected to the drive means for variation thereof in accordance with flow through the screening means, and valve means operatively connected to the liquid supply means for regulating the flow of liquid nutrient.

References Cited in the file of this patent

UNITED STATES PATENTS

| | | |
|---|---|---|
| 2,092,100 | Waynick | Sept. 7, 1937 |
| 2,498,480 | Bierlich | Feb. 21, 1950 |
| 2,779,670 | Burkett | Jan. 29, 1957 |
| 2,798,801 | Kieffer et al. | July 9, 1957 |
| 2,881,066 | Sproull et al. | April 7, 1959 |
| 2,901,339 | Boomer et al. | Aug. 25, 1959 |
| 2,931,716 | Kelley et al. | April 5, 1960 |
| 2,946,666 | Eymann | July 26, 1960 |
| 2,985,643 | Boomer et al. | May 23, 1961 |
| 2,995,434 | Burton | Aug. 8, 1961 |
| 3,011,876 | Raistrick | Dec. 5, 1961 |